United States Patent
Shupe (12)

(10) Patent No.: US 6,486,824 B1
(45) Date of Patent: Nov. 26, 2002

(54) TRACKING RADAR RECEIVER

(75) Inventor: Chester D. Shupe, Mesa, AZ (US)

(73) Assignee: General Dynamics Decision Systems, Inc,, Scottsdale, AZ (US)

( * ) Notice: Subject to any disclaimer, the term of this patent is extended or adjusted under 35 U.S.C. 154(b) by 0 days.

(21) Appl. No.: 06/789,008

(22) Filed: Jul. 22, 1985

(51) Int. Cl.[7] ................................. G01S 7/36
(52) U.S. Cl. ..................... 342/16; 342/17; 342/18; 342/19
(58) Field of Search ............... 343/18 E; 455/1; 342/16, 17, 18, 19

(56) References Cited

U.S. PATENT DOCUMENTS 3,805,163 A * 4/1974 Hata et al. ............... 343/18 E
3,921,171 A * 11/1975 Strother Jr. et al. ...... 343/18 E
4,114,152 A * 9/1978 Wiedemann et al. ..... 343/18 E
4,214,244 A * 7/1980 McKay et al. ........... 343/18 E

* cited by examiner

Primary Examiner—John B. Sotomayor
(74) Attorney, Agent, or Firm—Meschkow & Gresham, PLC

(57) ABSTRACT

A tracking radar receiver as described herein is relatively invulnerable to image frequency jamming. Partial image-rejection down-converters down-convert RF signals to IF signals in each of various sum and difference receiver channels. Image frequency components of the IF signals exhibit a predetermined amplitude and phase relationship relative to corresponding real frequency components for each of the channels. Thus, phase and amplitude tracking between the various channels is achieved even when image frequency signals are received.

12 Claims, 3 Drawing Sheets

TRACKING RADAR RECEIVER

BACKGROUND OF INVENTION

The present invention pertains generally to radar and more particularly to tracking radar receivers. Tracking radar receivers are used to generate angle error signals which indicate a deviation of an antenna's boresight direction from a desired direction. The present invention additionally relates to electronic counter-countermeasures (ECCM), and particularly to ECCM techniques which reduce the vulnerability of a tracking radar receiver to jamming signals which exhibit a frequency substantially equivalent to an image frequency characteristic of the receiver.

An image frequency represents a radio frequency (RF) signal which is separated in frequency from a real RF signal by two times an intermediate frequency (IF) in the direction of a local oscillator frequency. When a receiver employs RF gain prior to down-converting an RF signal into an IF signal, or operates in the presence of standoff jamming, noise which may appear at the image frequency adds to noise which appears at the real frequency in the resulting IF signal. Thus, the signal-to-noise ratio after conversion to IF normally decreases by 3 db over a corresponding signal-to-noise ratio which would be possible without the presence of image noise or standoff jamming.

Receiver designs typically utilize image noise reduction schemes to reduce image noise and thereby increase receiver sensitivity. One scheme uses a conventional image-reject mixer. The conventional image-reject mixer nulls out image frequency signals relative to real frequency signals. An object of a conventional image-reject mixer is to maximize image suppression. Image suppression represents a ratio of amplitudes of an image signal input to a real signal input for identical amplitude outputs. As a practical matter, image suppression of greater than 30 db is obtained and preserved over environmental extremes.

Tracking radar receivers may operate in two modes. In a first mode, tracking commands are generated based on "skin returns" of an object being tracked. In this first mode an increased receiver sensitivity increases the receivers ability to generate accurate tracking commands. Thus, it is desirable to employ an image-reject mixer to increase receiver sensitivity. In a second mode, tracking commands are generated based on a received signal, such as may occur when the object being tracked transmits a jamming signal. In this second mode, receiver sensitivity is relatively unimportant since jamming signals exhibit relatively large amplitudes. Tracking radar receivers may contain a plurality of channels, where each channel contains an image-reject mixer to increase receiver sensitivity. However, this structure makes such a tracking radar receiver vulnerable to a particular type of jamming when operating in the second mode.

If the object being tracked transmits a signal at the receiver's image frequency, the receiver's ability to generate tracking commands while operating in a track-on-jam mode may be seriously impaired or totally defeated. The vulnerability occurs because the image-reject mixers are balanced at a null condition at the image frequency. Although signal response of the receiver at the image frequency may be low relative to signal response at a corresponding real frequency, inadequate amplitude and phase tracking occurs between the various receiver channels when image frequency signals are received. For example, the image ratio of one channel might be 40 db while the image ratio of another channel might be only 30 db when overall amplitude response of the channels are equal. In this example, a 10 db amplitude response difference between channels exists at the image frequency. This amplitude difference can cause great deviation in tracking signal characteristics and can even cause polarity reversals. One example of such a polarity reversal might be the generation of an error signal which indicates upward movement when a correct error signal would indicate downward movement. Additionally, the phase relationship of signals output from image-reject mixers at the image frequency might substantially differ between the channels causing a similar result.

SUMMARY OF THE INVENTION

Accordingly, one object of the present invention concerns minimizing the degradation of receiver sensitivity to image noise while simultaneously maximizing a tracking radar receiver's immunity from image frequency jamming.

A further object of the invention concerns providing a partial image-rejection down-converter which can be used to adequately separate image frequencies from real frequencies in a tracking radar receiver while remaining relatively invulnerable to image frequency jamming.

The above and other objects and advantages of the present invention are carried out in one form by an improved receiver for a tracking radar. An antenna having a plurality of antenna elements couples to a combination hybrid which produces sum and difference signals from RF energy received at the antenna elements. The sum signal from the combination hybrid is down-converted to an IF frequency in a first partial image-rejection down-converter. Likewise, the difference signal from the combination hybrid is down-converted to the IF frequency in a second partial image-rejection down-converter. A demodulator produces an error output signal using an input signal from the second partial image-rejection down-converter and a reference signal output from the first partial image-rejection down-converter.

BRIEF DESCRIPTION OF THE DRAWINGS

Referring to the drawings, wherein like reference numbers indicate like parts throughout the figures.

DESCRIPTION OF THE PREFERRED EMBODIMENT

Figure 1:
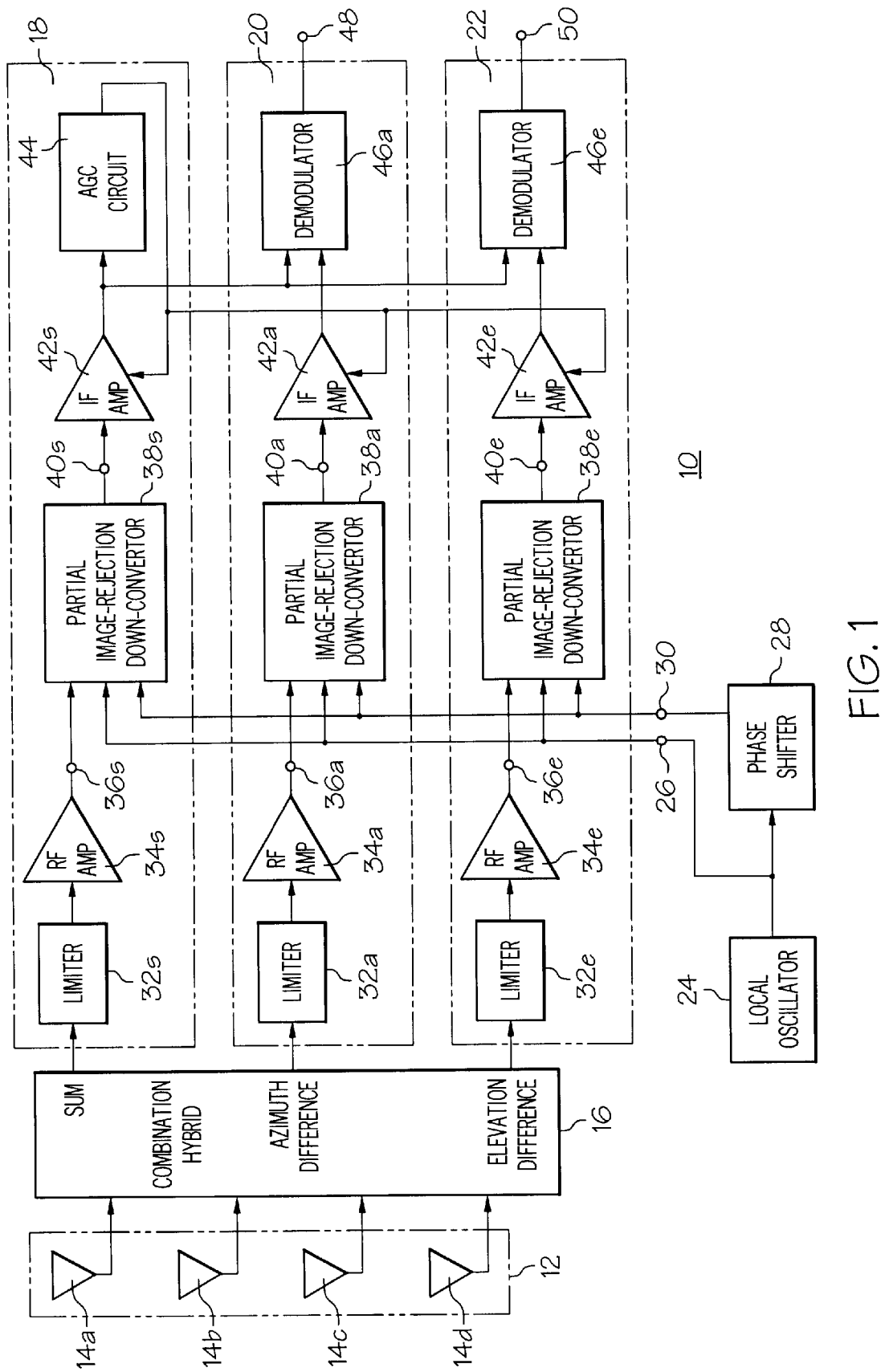
FIG. 1 shows a simplified block diagram of the tracking radar receiver of the present invention.

Referring to FIG. 1, a receiver 10 for a tracking radar contains antenna 12 which includes a plurality of antenna elements 14. In the present embodiment four elements 14a, 14b, 14c and 14d are positioned to exhibit an increased sensitivity in different quadrants of space. Antenna elements 14a and 14b exhibit increased sensitivity in quadrants to the left or right of quadrants monitored by elements 14c and 14d. Additionally, elements 14a and 14c exhibit increased sensitivity in quadrants above or below quadrants monitored by elements 14b and 14d. Signals eminating from the four different quadrants of space are received at elements 14 of antenna 12 and routed to a combination hybrid 16, such as a conventional sum and difference hybrid.

A sum output of combination hybrid 16 provides a signal which represents the sum of RF energy received at each of antenna elements 14. An azimuth difference output of combination hybrid 16 provides a signal which represents the sum of signals received at antenna elements 14a and 14b minus the sum of signals received at antenna elements 14c and 14d. Likewise, an elevation difference output of combination hybrid 16 provides a signal which represents the sum of signals received at antenna elements 14a and 14c minus the sum of signals received at antenna elements 14b and 14d. The sum output of combination hybrid 16 couples to a sum channel 18 of receiver 10, the azimuth difference output of combination hybrid 16 couples to an azimuth channel 20 of receiver 10, and the elevation difference output of combination hybrid 16 couples to an elevation channel 22 of receiver 10.

The sum output of combination hybrid 16 connects to an input of a limiter 32s, and an output of limiter 32s connects to an input of RF amplifier 34s. An output of amplifier 34s connects to an RF sum node 36s and to a first input of a partial image-rejection down-converter 38s. A local oscillator 24 has an output which connects to a local oscillator node 26, an input of a phase shifter 28, and a second input of partial image-rejection down-converter 38s. Phase shifter 28 has an output which connects to a quadrature node 30 and to a third input of partial image-rejection down-converter 38s. An output from partial image-rejection down-converter 38s connects to an IF sum node 40s and to a signal input of IF amplifier 42s. An output of IF amplifier 42s connects to an input of an automatic gain control (AGC) circuit 44 and to reference inputs of demodulators 46a and 46e, respectively. Demodulator 46a is contained within azimuth channel 20 and demodulator 46e resides within evelation channel 22. An output from AGC circuit 44 connects to a gain control input of an IF amplifier 42a, and a gain control input of an IF amplifier 42e. IF amplifiers 42a and 42e reside within azimuth channel 20 and elevation channel 22, respectively.

The azimuth difference output of combination hybrid 16 connects to an input of a limiter 32a which resides within azimuth channel 20. An output of limiter 32a connects to an input of a RF amplifier 34a, and an output from RF amplifier 34a connects to an RF azimuth node 36a and to a first input of a partial image-rejection down-converter 38a. Local oscillator node 26 connects to a second input and quadrature node 30 connects to a third input, respectively, of partial image-rejection down-converter 38a. An output of partial image-rejection down-converter 38a connects to an IF azimuth node 40a and to a signal input of IF amplifier 42a. An output of IF amplifier 42a connects to a signal input of demodulator 46a, and an output of demodulator 46a connects to an azimuth angle error node 48.

Elevation channel 22 closely resembles azimuth channel 20. Thus, the elevation difference output of combination hybrid 16 connects to an input of a limiter 32e. An output of limiter 32e connects to an input of RF amplifier 34e, and an output of RF amplifier 34e connects to an RF elevation node 36e, and down-converter 38e. Local oscillator node 26 and quadrature node 30 connect to second and third, respectively, inputs of partial image-rejection down-converter 38e. An output of partial image-rejection down-converter 38e connects to an IF elevation node 40e and to a signal input of IF amplifier 42e. An output of IF amplifier 42e connects to a signal input of demodulator 46e, and an output of demodulator 46e connects to an elevation angle error node 50.

Substantial similarity in circuitry exists between each of the sum, azimuth and elevation channels. For each channel, an RF signal provided by combination hybrid 16 is potentially limited in a limiter 32 and amplified in an RF amplifier 34. Each partial image-rejection down-converter 38 receives an RF signal at its first input, and receives reference and quadrature signals at its second and third inputs. In a manner discussed below in connection with FIGS. 2 through 5, partial image-rejection down-converters 38 each convert the RF signal provided on a respective node 36 into an IF signal at an IF node 40. In the IF signals ouput from down-converters 38 at IF nodes 40, image frequency components are reduced in amplitude between 10 and 16 db from corresponding real frequency components of the IF signal.

The IF signal in the sum channel drives automatic gain control circuit 44 and additionally provides a reference signal to demodulators 46a and 46e. Automatic gain control circuit 44 provides a signal to the gain control inputs of IF amplifiers 42. Thus, constant amplitude signals are input to demodulators 46. Demodulators 46 in azimuth and elevation channels 20 and 22 represent phase detectors which convert IF, azimuth and elevation difference signals into azimuth angle and elevation angle error signals at nodes 48 and 50, respectively.

In each of the sum, azimuth and elevation channels 18, 20 and 22, respectively, down-conversion from RF to IF frequencies occurs independently from the down-conversion occurring in the other channels. Each of down-converters 38 exhibits a similar response to input signals. Thus, tracking occurs between the channels, and the angle error signals provided at nodes 48 and 50 exhibit predictable characteristics. Further, this tracking occurs regardless of whether an image frequency signal is being down-converted. The insensitivity to image frequency signals is provided by partial image-rejection down-converter 38.

Figure 2:
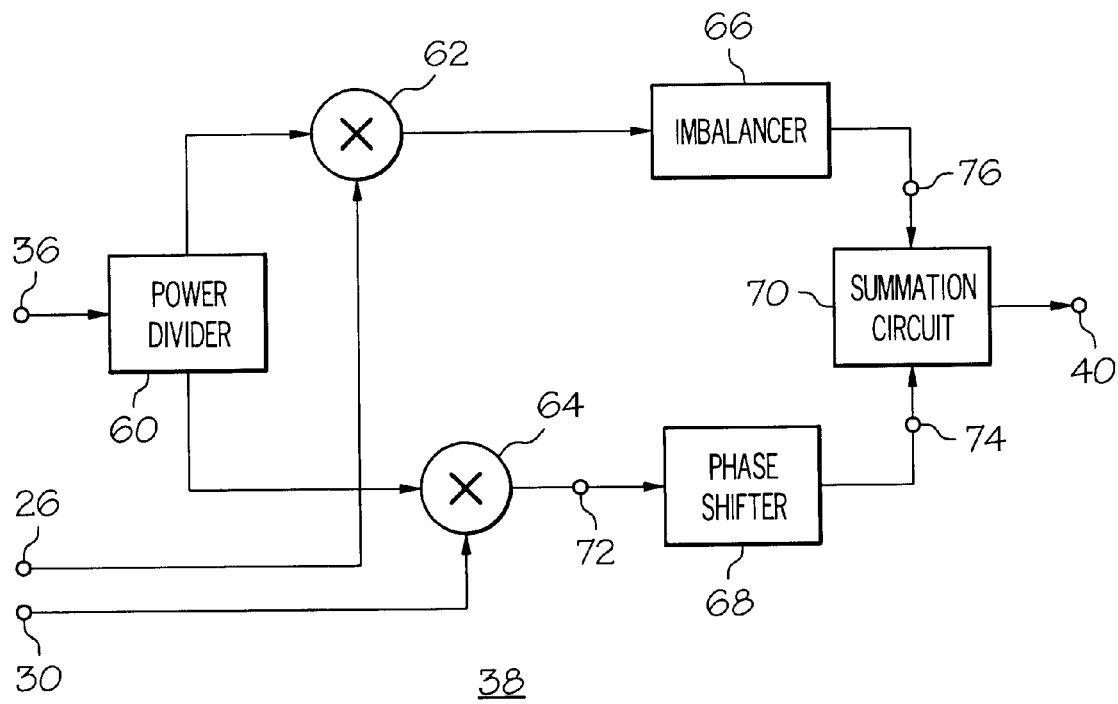
FIG. 2 shows a first embodiment of a partial image-rejection down-converter portion of the present invention.

Referring to FIG. 2, a first embodiment of a partial image-rejection down-converter 38, which may be used in each of channels 18, 20 and 22, is shown. RF node 36 connects to an input of a power divider 60. Power divider 60 splits the RF signal into approximately equal power level signals at first and second outputs thereof. The first output of power divider 60 connects to a first input of a mixer 62, and the second output of power divider 60 connects to a first input of a mixer 64.

A second input of mixer 62 connects to local oscillator node 26, and a second input of mixer 64 connects to quadrature node 30. An IF local oscillator reference signal is presented at node 26, and the IF local oscillator reference signal, shifted in phase by 90°, is provide at node 30. Thus, outputs of mixers 62 and 64 provide IF signals which are shifted in phase from each other by 90°. As known to those skilled in the art of designing conventional image-reject mixers, connections to nodes 26 and 30 may be swapped depending on whether an upper or lower sideband is desired in the down-convertion.

The output of mixer 62 connects to an input of an imbalancer 66, and an output of mixer 64 connects to a node 72 and an input of phase shifter 68. An output of imbalancer 66 connects to a node 76 and to a first input of a summation circuit 70. An output of phase shifter 68 connects to a node 74 and to a second input of summation circuit 70. An output of summation circuit 70 connects to IF node 40.

An RF signal is split into two equal portions in divider 60, and the equal portions are down-converted to intermediate IF signals in mixers 62 and 64. After down-conversion in mixers 62 and 64, image frequency components from the RF signal exhibit the same frequency in the intermediate IF signals as corresponding real components exhibit. In the FIG. 2 embodiment, phase shifter 68 may advantageously shift the phase of the intermediate IF signal output from mixer 64 by 90°.

In the present invention imbalancer 66 represents an attenuator, such as an RF pad, or a phase shifter, or a combination of the two. Imbalancer 66 conditions the intermediate IF signal output from mixer 62 so that when this signal adds in summation circuit 70 with the intermediate IF signal output from phase shifter 68, the image components and the real frequency components exhibit a predetermined relationship relative to each other. This predetermined relationship insures that the image frequency components of the intermediate IF signals output from mixers 62 and 64 do not balance, or null, each other out. Hence, it imbalances the image frequency components. In this predetermined relationship the magnitude of the image component of the IF signal output from summation circuit 70 is between 10 and 16 db less than the magnitude of the corresponding real frequency component. Further, this 10 to 16 db of image suppression is maintained over environmental extremes. In order to insure that the predetermined image suppression neither significantly increases nor decreases over environmental extremes, the devices used in constructing down-converters 38 and the other portions of channels 18, 20 and 22 are relatively stable devices.

The 10–16 db range is a desirable range when using devices which would be capable of achieving and maintaining 30 db of image suppression if used in a conventional image-reject mixer. If greater than 16 db of image suppression are used, receiver sensitivity slightly increases, but accuracy of angle error tracking signals generated from tracking an image jamming signal suffers. On the other hand, if less than 10 db of image suppression are used angle error tracking signals may be slightly more accurate, but receiver sensitivity suffers.

Figure 4:
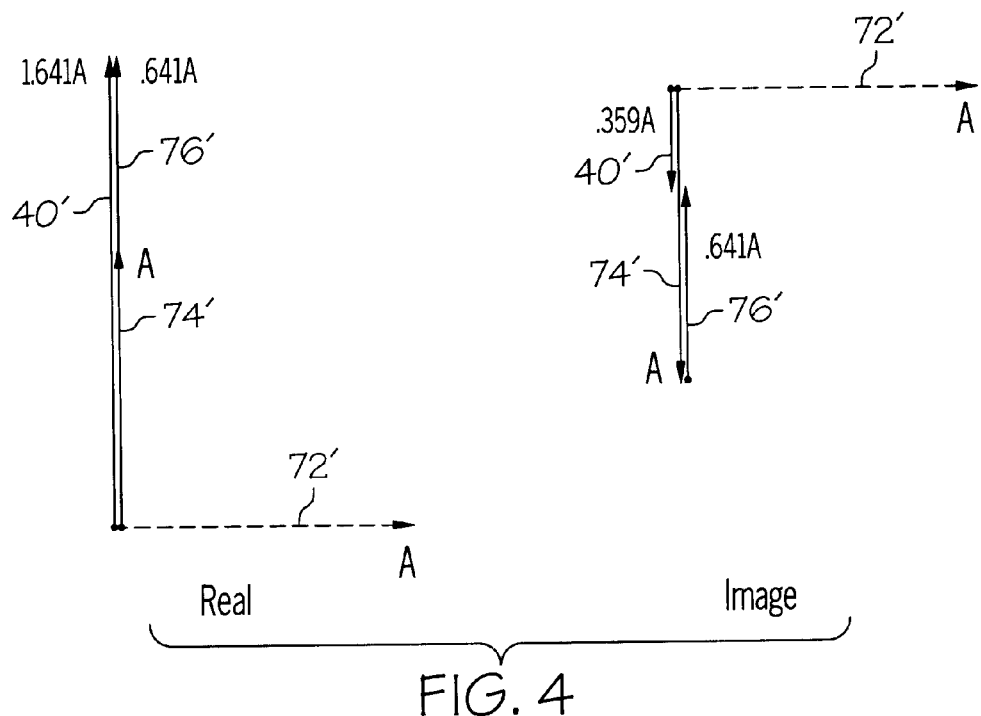
FIG. 4 shows a vector diagram depicting the operation of the partial image-rejection down-converter of FIG. 2.

FIG. 4 shows a vector diagram which represents one example of the predetermined image frequency to real frequency relationship. In the FIG. 4 example, imbalancer 66 from FIG. 2 is assumed to be an attenuator which attenuates the IF signal presented at its input to an output amplitude which is 64.1% of the input amplitude. Additionally, phase shifter 68 is assumed to shift the phase of a signal by 90°. For the real frequency portion of FIG. 4, vector 72' shows an amplitude and phase of a signal at node 72 (see FIG. 2). After phase shifter 68 shifts this signal in phase by 90°, vector 74' results. Vector 74' exhibits an amplitude A.

Vector 76' is not shifted in phase from the signal output at mixer 62, but is attenuated. Thus, the amplitude of vector 76' is 0.641A. Since vectors 76' and 74' exhibit no relative phase difference, after addition in summation circuit 70 the resulting real frequency component is shown as vector 40' which exhibits an amplitude of 1.641A.

Referring to the image frequency portion of FIG. 4, vector 72' represents the image component at node 72, and vector 74' represents the image component at node 74, which occurs after vector 72' has been shifted in phase by 90°. Phase changes of image frequency components decrease at the same rate that real frequency components increase, or vice versa depending on whether upper or lower sidebands are used. Thus, the real and image frequency components of vector 74' each rotate 90° but in opposing directions. At node 74 the real and image frequency components exhibit equal amplitudes, but at 180° of phase shift.

Vector 76' for the image frequency component equals vector 76' for the real frequency component becuase no phase shifting occurs at the output of mixer 62. The amplitude of image frequency vector 76' is 0.641 times the amplitude of the image frequency vector 74' due to the operation of imbalancer 66, as discussed above. Since the image components of vectors 74' and 76' are 180° out of phase, their amplitudes subtract leaving a-resultant vector having an amplitude of 0.359A, as shown at vector 40'. The resulting ratio of the image frequency component (0.359A) to the real frequency components (1.641A) is 0.22, or 13 db. Thus, image frequency comonents have been partially rejected and will be maintained at a level 13 db below real frequency components.

Figure 3:
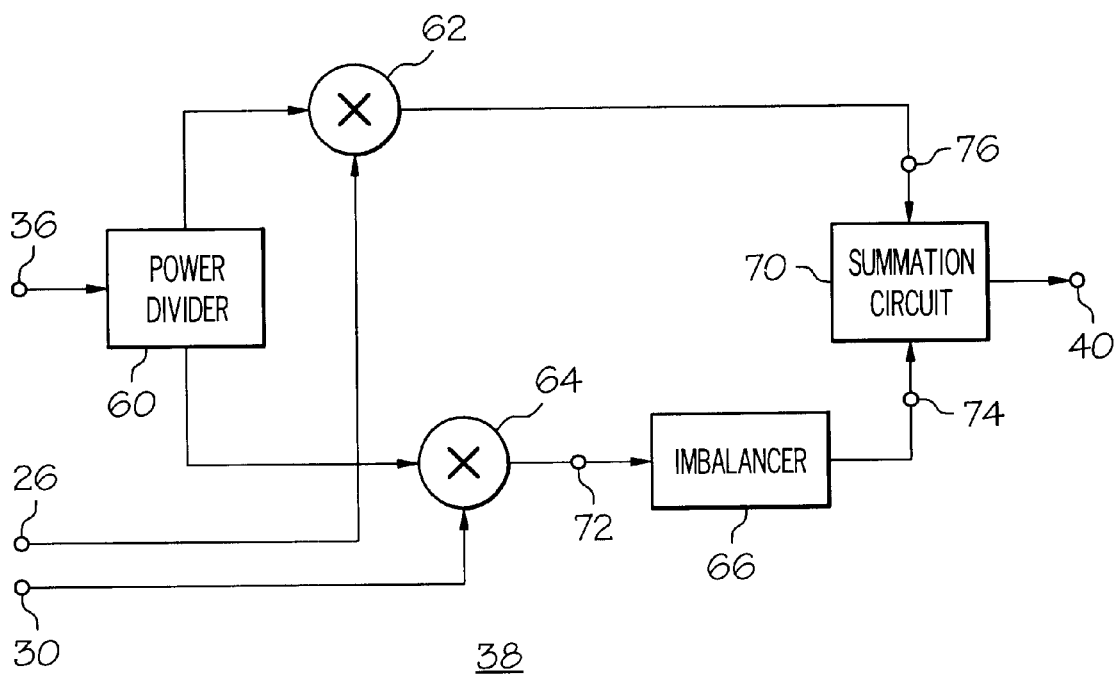
FIG. 3 shows a second embodiment of a partial image-rejection down-converter portion of the present invention.

Referring to FIG. 3, a second embodiment of a partial image-rejection down-converter 38 is shown. As in the FIG. 2 embodiment, RF node 36 connects to an input of power divider 60. Outputs of power divider 60 connect to first inputs of mixers 62 and 64. Second inputs of mixers 62 and 64 connect to local oscillator node 26 and quadrature node 30, respectively. The output from mixer 62 connects directly to node 76 and a first input of summation circuit 70, while the output of mixer 64 connects to node 72 and an input of imbalancer 66. An output of imbalancer 66 connects to node 74 and a second input of summation circuit 70. The output of summation circuit 70 connects to IF node 40.

Figure 5:
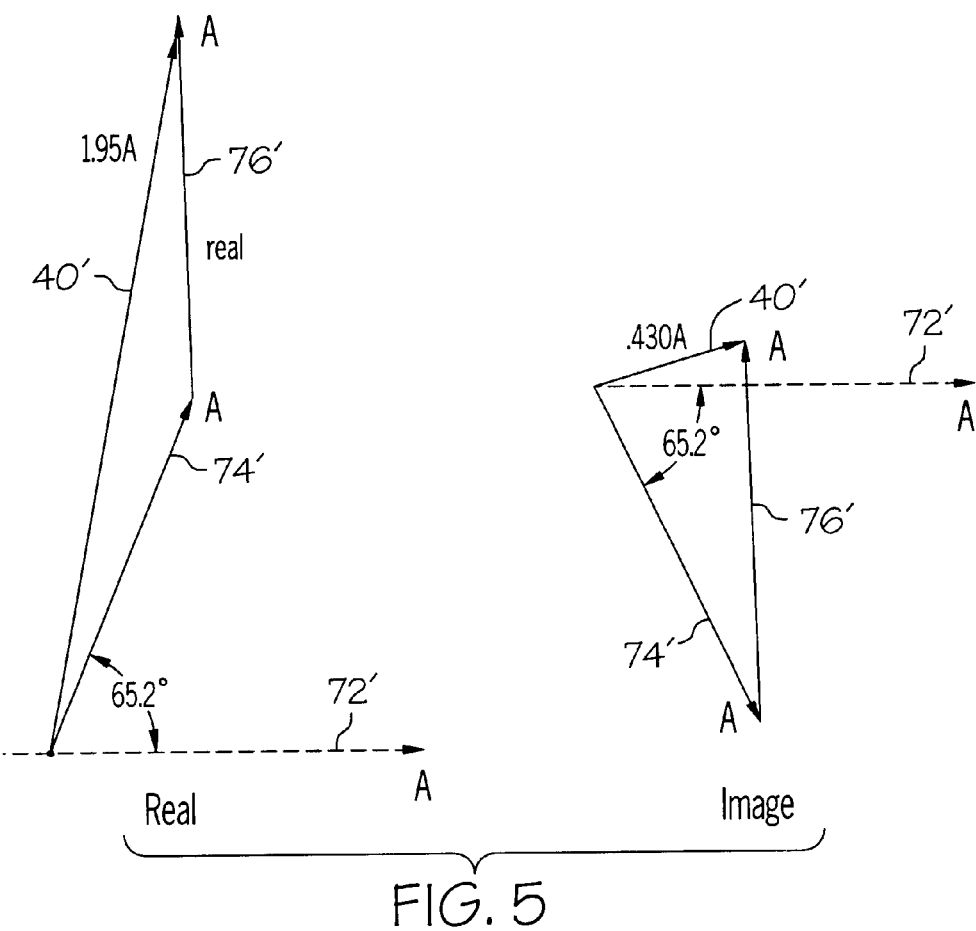
FIG. 5 shows a vector diagram representing the opertion of the partial image-rejection down-converter of FIG. 3.

In this embodiment imbalancer 66 contains some degree of phase shift. It may additionally employ amplitude attenuation. However, no phase shift or amplitude attenuation occurs in the signal output from mixer 62 and input to summation circuit 70. One example of a partial image-rejection down-converter using the FIG. 3 embodiment is depicted in the vector diagram of FIG. 5. In FIG. 5, vector representations of signals appearing at correspondingly referenced nodes from the FIG. 3 embodiment are shown. The FIG. 5 vector diagram assumes that imbalancer 66 represents a phase shifter which shifts the phase of signals by 65.2°. Imbalancer 66 does not provide amplitude attenuation in this example.

For the real frequency components in this example, vector 74' represents the signal output from imbalancer 66, which is shifted from vector 72° by 65.2° Summation circuit 70 adds this signal with vector 76', which is neither attenuated nor shifted in phase. The resulting IF signal, shown as vector 40', exhibits a magnitude of 1.95A, where A represents the magnitudes of vectors 74' and 76'.

Referring to the image frequency components in this example, vector 74' rotates in an opposing direction relative to vector 72' from that described above for the real frequency components. Vector 76' exhibits no phase shift. Thus, the addition of vector 74' with vector 76' results in a vector 40' having an amplitude of 0.43A, where A represents the amplitude of each of vectors 74' and 76'. As discussed above in connection with FIG. 4, the ratio of image frequency components (0.043A) to real frequency components (1.95A) equals 0.22 or 13 db.

In summary, image frequency components are not nulled to a minimum achievable amplitude in partial image-rejection down-converters 38. Rather, the image frequency components exhibit a predetermined phase and a predetermined amplitude relation relative to real frequency components. Overall receiver signal-to-noise may increase by nulling out image frequency components to minimum achievable amplitudes. However, the increase is only 0.2 db when the image ratio is 13 db. On the other hand, since image frequency components exhibit known phase and amplitude characteristics, each of partial image-rejection down-converters 38 within receiver 10 (see FIG. 1) react in a predictable manner to the receipt of image frequency signals. Each of partial image-rejection down-converters 38 tracks the other down-converters 38 within receiver 10, and the maximum tracking error of a receiver using partial image-rejection down-converters 38 which have an image ratio of 13 db is less than 13° at the image frequency.

The above description presents the present invention in terms of preferred embodiments. However, those skilled in the art of tracking radar receiver designs are aware that many changes and modifications may be made in these preferred embodiments without departing from the scope of the present invention. For example, many combinations of phase shift and amplitude attenuation at the outputs of mixers 62 and 64 may be employed in an imbalancer 66 to achieve the desired image ratio. Particular examples are presented herein only for the purpose of teaching the present invention and do not limit its scope. Changes and modifications which are obvious to those skilled in the art are included within the scope of the present invention.

What is claimed is:

1. A receiver for a tracking radar, said receiver comprising:
    an antenna having a plurality of elements;
    a combination hybrid having a plurality of inputs each of which is coupled to a, unique one of said plurality of elements of said antenna and having sum and difference outputs;
    a first partial image-rejection down-converter coupled to the sum output of said combination hybrid;
    a second partial image-rejection down-converter coupled to the difference output of said combination hybrid; and
    a demodulator having a first input coupled to the output of said first down-converter and a second input coupled to the output of said down-converter, said demodulator being for providing an error output signal.

2. A receiver as claimed in claim 1 additionally comprising a local oscillator having an output and a first phase shifter having an output and an input, the first phase shifter input being coupled to the output of said local oscillator, wherein one of said first and second down-converters comprises:
    a first mixer having a first input coupled to said combination network, a second input coupled to the output of said local oscillator, and an output;
    a second mixer having a first input coupled to said combination network, and a second input coupled to the output of said first phase shifter;
    second phase shifter having an input coupled to the output of said second mixer and having an output; and
    an imbalancer having an input coupled to the output of said first mixer and an output coupled to the output of said second phase shifter, said imbalancer being for causing image suppression of said one of said first and second down-converters to be less than first predetermined quantity and greater than a second predetermined quantity.

3. A tracking radar receiver as claimed in claim 2 wherein said imbalancer comprises an attenuator.

4. A tracking radar receiver as claimed in claim 2 wherein said imbalancer comprises a third phase shifter.

5. A tracking radar receiver as claimed in claim 2 wherein the other of said first and second down-converters comprises:
    a third mixer having a first input coupled to said combination network, a second input coupled to the output of said local oscillator, and an output;
    a fourth mixer having a first input coupled to said combination network and a second input coupled to the output of said first phase shifter;
    a third phase shifter having an input coupled to the output of said fourth mixer and having an output; and
    a second imbalancer having an input coupled to the output of said third mixer and an output coupled to the output of said third phase shifter.

6. A tracking radar receiver as claimed in claim 2 wherein said imbalancer is adjusted so that image suppression of said one of said first and second down-converters is between 10 db and 16 db.

7. A tracking radar receiver as claimed in claim 1 additionally comprising a local oscillator having an output and a first phase shifter having an output and an input, the first phase shifter input being coupled to the output of said local oscillator, wherein one of said first and second down-converters comprises:
    a first mixer having a first input coupled to said combination network, a second input coupled to the output of said local oscillator, and an output;
    a second mixer having a first input coupled to said combination network, and a second input coupled to the output of said first phase shifter; and
    an imbalancer having an input coupled to the output of said second mixer and an output coupled to the output of said first mixer, said imbalancer being for causing an image ratio of said one of said first and second down-converters to be less than a first predetermined quantity and geater than a second predetermined quantity.

8. A tracking radar receiver as claimed in claim 7 wherein said imbalancer comprises a second phase shifter.

9. A tracking radar receiver as claimed in claim 7 wherein said imbalancer comprises an attenuator coupled in series with a second phase shifter.

10. A tracking radar receiver as claimed in claim 7 wherein the other of said first and second down-converters comprises;
    a third mixer having a first input coupled to said combination network, a second input coupled to output of said local oscillator, and an output;
    a fourth mixer having a first input coupled to said combination network and a second input coupled to the output of said first phase shifter; and
    a second imbalancer having an input coupled to the output of said fourth mixer and an output coupled to the output of said third mixer.

11. A tracking radar receiver as claimed in claim 7 wherein said imbalancer is adjusted so that the image ratio of said one of said first and second down-converters is between 10 db and 16 db.

12. A method of processing signal in a tracking radar, said method comprising the steps of:
    receiving, at a plurality of antenna elements, a radio frequency signal;
    combining signals from the antenna elements of said receiving step to produce a sum signal and a difference signal;
    imbalancing image frequency components of the sum signal from said combining step in a first partial image-rejection down-converter that produces a first IF signal so that an image ratio of the first down-converter is between 10 db and 16 db;
    imbalancing image frequency components of the difference signal from said combining step in a second partial image-rejection down-converter that produces a second IF signal so that an image ratio of the second down-converter is between 10 db and 16 db; and
    demodulating the first and second IF signals to produce an error signal.

* * * * *